(12) United States Patent
Baehrle-Miller et al.

(10) Patent No.: US 10,697,510 B2
(45) Date of Patent: Jun. 30, 2020

(54) BRAKING DEVICE FOR A MOTOR VEHICLE, AND METHOD FOR CONTROLLING THE BRAKING DEVICE

(71) Applicant: Robert Bosch GmbH, Stuttgart (DE)

(72) Inventors: Frank Baehrle-Miller, Schoenaich (DE); Simon Hauber, Freiberg am Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 246 days.

(21) Appl. No.: 15/317,075

(22) PCT Filed: Jul. 9, 2015

(86) PCT No.: PCT/EP2015/065679
§ 371 (c)(1),
(2) Date: Dec. 7, 2016

(87) PCT Pub. No.: WO2016/034314
PCT Pub. Date: Mar. 10, 2016

(65) Prior Publication Data
US 2017/0097060 A1    Apr. 6, 2017

(30) Foreign Application Priority Data

Sep. 1, 2014 (DE) .......................... 10 2014 217 445

(51) Int. Cl.
*F16D 65/18* (2006.01)
*B60T 13/74* (2006.01)
(Continued)

(52) U.S. Cl.
CPC ............ *F16D 65/18* (2013.01); *B60T 13/741* (2013.01); *F16D 2121/02* (2013.01);
(Continued)

(58) Field of Classification Search
CPC .. F16D 65/18; F16D 2121/02; F16D 2121/04; F16D 221/24; F16D 2123/00; F16D 2125/40; F16D 2125/582
(Continued)

(56) References Cited

U.S. PATENT DOCUMENTS 5,348,123 A * 9/1994 Takahashi ................. B60T 7/04
188/162
6,409,289 B2 * 6/2002 Wagner ..................... B60T 8/00
303/1
(Continued)

FOREIGN PATENT DOCUMENTS

CN    201162795 Y    12/2008
CN    101351655 A     1/2009
(Continued)

OTHER PUBLICATIONS

International Search Report corresponding to PCT Application No. PCT/EP2015/065679, dated Sep. 17, 2015 (German and English language document) (6 pages).

*Primary Examiner* — Thomas W Irvin
(74) *Attorney, Agent, or Firm* — Maginot, Moore & Beck LLP (57) ABSTRACT

A braking device for a motor vehicle includes at least one brake, at least one brake pad, a brake disk, and an elastic element. The elastic element is configured to place the brake pad against the brake disk such that the brake pad and the brake disk generate either no braking force or a small braking force acting on the motor vehicle. The at least one brake is operatively interrelated with the elastic element.

16 Claims, 7 Drawing Sheets

(51) Int. Cl.
*F16D 121/04* (2012.01)
*F16D 121/24* (2012.01)
*F16D 123/00* (2012.01)
*F16D 125/40* (2012.01)
*F16D 121/02* (2012.01)
*F16D 125/58* (2012.01)

(52) U.S. Cl.
CPC ...... *F16D 2121/04* (2013.01); *F16D 2121/24* (2013.01); *F16D 2123/00* (2013.01); *F16D 2125/40* (2013.01); *F16D 2125/582* (2013.01)

(58) Field of Classification Search
USPC .................................. 188/72.4, 72.8, 73.38
See application file for complete search history.

(56) References Cited

U.S. PATENT DOCUMENTS

| | | | | |
|---|---|---|---|---|
| 7,992,946 B2 * | 8/2011 | Franzke | .................. | B60T 7/108 303/11 |
| 9,156,443 B2 * | 10/2015 | Isono | ..................... | F16D 55/226 |
| 9,604,605 B2 * | 3/2017 | Shim | ..................... | B60T 13/588 |
| 9,643,583 B2 * | 5/2017 | Baehrle-Miller | ..... | B60T 13/662 |
| 2013/0068572 A1 | 3/2013 | Isono | | |

FOREIGN PATENT DOCUMENTS

| | | |
|---|---|---|
| CN | 103069187 A | 4/2013 |
| DE | 42 29 042 A1 | 3/1993 |
| DE | 101 11 076 A1 | 12/2001 |
| DE | 10 2006 029 979 A1 | 1/2008 |
| DE | 10 2008 042 778 A1 | 4/2010 |
| DE | 10 2012 205 576 A1 | 10/2013 |
| JP | 5-60157 A | 3/1993 |
| JP | 2006-103353 A | 4/2006 |
| JP | 5278597 B2 | 5/2013 |
| WO | 2005/059395 A1 | 6/2005 |
| WO | 2011/118046 A1 | 9/2011 |
| WO | 2015/124545 A2 | 8/2015 |

* cited by examiner

BRAKING DEVICE FOR A MOTOR VEHICLE, AND METHOD FOR CONTROLLING THE BRAKING DEVICE

This application is a 35 U.S.C. § 371 National Stage Application of PCT/EP2015/065679, filed on Jul. 9, 2015, which claims the benefit of priority to Serial No. DE 10 2014 217 445.7, filed on Sep. 1, 2014 in Germany, the disclosures of which are incorporated herein by reference in their entirety.

The present disclosure relates to a braking device for a motor vehicle and to a method for controlling the braking device.

BACKGROUND

Owing to the mode of operation of a hydraulic wheel brake, the brake piston is retracted somewhat into the brake caliper housing by the piston sealing ring when the service brake is not actuated. In addition, the brake disk may be deflected somewhat out of its rest position and the brake piston may be pushed further back into the brake caliper housing during dynamic driving maneuvers (rapid cornering, driving over irregularities). Overall, this increases the volume required to reapply the brake piston to the brake pads. Since the delivery rate of the hydraulic actuator of an ESP system (Electronic Stability Program) is limited, a hydraulic volume is first of all required in the brake caliper housing in order to push the brake piston in the direction of the pads. Only then is a pressure and force buildup possible. During this process, there is a loss of time between the demand for braking and the provision of a braking force.

The prior art includes DE 10 2006 029 979 A1, for example. This describes a method for operating a brake system of a motor vehicle having at least one operating mode involving pre-filling for at least partially overcoming a release clearance of one or more wheel brakes before an expected actuation of a brake pedal. Here, the release clearance is overcome by the hydraulic unit, i.e. by the hydraulic service braking system.

The prior art furthermore includes DE 101 11 076 B4, for example. This describes a brake disk wiper, wherein the brake actuators are controlled in such a way when an activation condition is met that the brake pads are placed against the brake disk in such a way that no deceleration that is perceptible to the driver or a deceleration which is virtually imperceptible to the driver is set. In this case, the brake actuators are the actuators of a hydraulic service brake system.

However, the buildup of a hydraulic pressure by means of the hydraulic service brake system to place the brake pads in contact gives rise, when there is actual contact, to a link, i.e. coupling, between the actuator and the brake pads. As a result, unwanted braking forces due to the prevailing hydraulic pressure can arise. Moreover, unwanted braking pulses and periodic noises, which negatively affect the perception of comfort of the driver, can occur owing to runout in the brake disk, for example.

In addition, known hydraulic actuators must first of all draw in brake fluid in order to be able to build up pressure. At low temperatures, the viscosity of the brake fluid increases, making intake more difficult. Pressure is provided only with a delay.

It is therefore the object of the present disclosure to provide a braking device and a method for controlling the braking device, by means of which pressure buildup dynamics can be improved, i.e. by means of which a loss of time between the demand for braking and the provision of braking force is minimized. However, the buildup of a braking force and an interaction between the brake disk and the brake actuator should be substantially avoided until there is an actual demand for a braking force (i.e. until the demand for braking).

This object is achieved by the features of the disclosure. Developments of the disclosure are provided by additional features of the descriptions, drawings, and claims.

For this purpose, a braking device is provided for a motor vehicle. This braking device comprises at least one brake, at least one brake pad and a brake disk, wherein the brake pad can be placed against the brake disk in such a way that no braking force or only a small braking force acting on the motor vehicle is built up. According to the disclosure, it is envisaged that the brake pad can be placed against the brake disk by means of an elastic element.

This is understood to mean that a brake actuator places the brake pad against the brake disk by means of the elastic element. During this process, a movement and/or a force is transmitted to the elastic element by actuation of the brake actuator. In particular, the force and/or movement is orthogonal with respect to the brake disk. During this process, a movement or elastic force in the elastic element is also produced.

A brake piston can furthermore be provided, said piston being positioned between an actuator of the brake and the brake pad. Here, the brake piston converts a force or movement provided by the actuator, for example, into a clamping force between the brake pad and the brake disk.

As regards its elasticity, the elastic element is designed to be sufficiently powerful to ensure that the elastic force resulting from the actuator movement in the elastic element is sufficient to move the brake piston in the direction of the brake disk. At the same time, however, the elastic element is designed in such a way, as regards its elasticity, that, when the brake pads are placed in contact, the clamping force resulting from the elastic force transmitted to the brake disk is so small that no braking force or only a small braking force is produced. Such a small braking force thus leads to no deceleration or to a deceleration which is imperceptible or virtually imperceptible to the driver. The brake pads are thus placed against the brake disk in such a way by the elastic element that the driver does not perceive actual contact of the brake pads.

By means of the device presented, a large proportion of the required hydraulic volume is already moved in advance of the actual braking operation. It is thereby also possible largely to avoid a delay in the provision of braking force due to the change in viscosity of the brake fluid since, as a result, even small volume flows in the intake channel of the pump lead directly to provision of a braking force at low temperatures.

It should furthermore be mentioned that a disk is generally not completely free of disk runout. However, the unbalance of the brake disk arising in the case of braking runout is, by virtue of the elastic element, advantageously not transmitted to the brake system; on the contrary, the elastic element enables the brake piston or the brake pads to follow the disk geometry. The braking torques which arise in this case are very small.

In addition to use for providing emergency braking and use in the region of autonomous driving, a device of this kind can also be used as a brake disk wiper in order, for example, to wipe an unwanted film, in particular water, from the brake disk without the need for the driver to intervene to achieve this or feeling this due to a deceleration of the vehicle.

It is advantageous if the braking device has a service brake and an automated parking brake. This should be taken to mean that the at least one brake is configured as a service brake and as an automated parking brake. The braking device therefore has two brake systems, in particular two different brake actuators. In particular, the service brake is configured as a hydraulic device with a brake fluid as an operating medium. In particular, the service brake should be regarded as a standard vehicle brake. Here, the service brake can advantageously be configured as an ESP system. In this case, an ESP pump forms the brake actuator of the service brake. As an alternative to an ESP pump as a brake actuator, pressure can also be provided by an i-booster or some other pressure-supplying system (EHB, plunger system).

The automated parking brake, also referred to as an automated (or automatic) immobilizing brake, is advantageously configured as an electromechanical device, having an electric motor as a brake actuator for the automated parking brake, a spindle and a spindle nut. The service brake and the parking brake can be combined in one housing. Furthermore, both brakes can also use one and the same brake piston, brake pads and brake disk. Coupling and assistance between the two brakes is advantageously possible, e.g. the hydraulic service brake can be used to assist, by means of hydraulic pressure, application or, in particular, further tightening of the electromechanical parking brake.

It is advantageous if, on the basis of actuation of the parking brake, the brake pad is placed against the brake disk by means of an elastic element. To place the brake pad against the brake disk, the brake piston is moved, as already described. Provision is made here for a brake actuator of the parking brake to move the brake piston by means of the elastic element and thus to place the brake pad against the brake disk.

In this case, use is advantageously made of the possibility of setting a particular and lasting deflection of the parking brake, said deflection serving as a basis for the use of the elastic element: the defined deflection of the parking brake taking into account a possible deformation of the elastic element eliminates a release clearance between the brake pad and the brake disk, wherein the elastic element furthermore allows partial decoupling of the actuator from the brake disk.

As an alternative, it would also be possible to supply a hydraulic pressure which presses the brake pistons "gently" against the brake pads. However, it is disadvantageous here that low pressures can be set only with difficulty. This is most readily possible if the backpressure of the hydraulic actuator and of the downstream components thereof is exploited. In this case, a correspondingly large volume is displaced, while the valves are not closed. The brake pistons are pressed against the brake pads by the backpressure. If the hydraulic actuator is switched off, the brake piston returns to its initial position again. It is not possible in this way to implement prolonged contact between the brake pads and the brake disk in a manner which is favorable in terms of energy.

"Trapping" a low pressure also has disadvantages. The trapped pressure forms a resistance to the brake piston being forced back into the brake caliper housing. Since the brake disk is never 100% free from axial runout, disk runout repeatedly leads to pressure and hence also clamping-force spikes, which lead primarily to increased friction and hence also to increased wear. Moreover, the friction also imposes thermal stress on the disk and the pads.

The use of the parking brake overcomes the disadvantages which have been described of a possible use of the service brake for acting on the elastic element to place the brake pad against the brake disk.

The parking brake advantageously places the brake pad against the brake disk by means of the elastic element. This should be taken to mean that the parking brake is activated and undergoes a change, e.g. a change in length. On the basis of this change, it is possible for the parking brake to produce a change, e.g. change in length, in the elastic element. By virtue of the characteristic of the elastic element, said element likewise transmits such a change, if only to a limited extent, to the brake pad and places the latter against the brake disk.

It is advantageous if the elastic element is configured as a spring system. In this case, spiral springs, for example, provide a suitable spring characteristic. In an alternative advantageous embodiment, it is possible to use not only a linear spring characteristic but also a progressive or stepped spring characteristic. In particular, soft springs, e.g. spring packs, are advantageous in order to ensure decoupling. Moreover, it is possible to combine a plurality of springs into an overall system, wherein the spring characteristics of the individual springs are incorporated in corresponding fashion into the characteristic of the overall system.

In an advantageous embodiment of the braking device, the elastic element is arranged between the spindle nut of the parking brake and the brake piston. In this case, the movement and/or the force of the electromechanical brake actuator of the parking brake is transmitted to the elastic element by the spindle nut in a direction axial with respect to the spindle of the parking brake.

It is advantageous if the braking device is designed to assume various states, wherein, in a first state, no force is transmitted to the brake disk, and, in a second state, a force, in particular a small force, is transmitted to the brake disk by means of the elastic element, and, in a third state, a force is transmitted to the brake disk by means of a geometric link.

This should be taken to mean that, in a first state of the braking device, there is decoupling between the actuator and the brake disk in respect of force transmission. This force transmission advantageously relates also to forces which arise due to component displacement, for example. By virtue of the decoupling, no forces are transmitted from the actuator to the brake disk, and also no forces are transmitted from the brake disk to the actuator.

In a third state, there is a geometric link—also referred to as a rigid or non-elastic link—between the brake disk and the actuator. By means of this geometric link, the elastic property of the elastic element is excluded. By means of this link, it is therefore likewise possible for forces and movements to be transmitted; however, transmission takes place without a significant reduction in the magnitude of the force or the movement. This link can be made indirectly by means of a plurality of components. The geometric link can be regarded as non-elastic, by virtue of direct contact between two substantially non-elastic components for example.

Even in the presence of an elastic component, a geometric link can be formed by bridging the elastic component—e.g. by means of a geometric configuration of components adjacent to the elastic component. It is advantageous if the geometric link is formed by means of positive connection of non-elastic components, e.g. a spindle nut and a brake piston. This should be taken to mean that the spindle nut and the brake piston have direct contact for the transmission of a movement or a force in the axial direction.

A geometric link can also arise from an elastic component if the elastic component is connected in such a way that it loses its elastic properties, e.g. through block formation by the elastic component. "Block formation" should be taken to mean that a further deformation—and hence further elasticity—is no longer possible, by virtue especially of geometrical restrictions. By way of example, attention should be drawn to a spiral spring, which forms a block or is moved so as to form a block as soon as the spring turns are resting upon one another and therefore no further spring property is effective.

It is advantageous, however, if, in a second state, which is passed through between the first and the third state, partial transmission of forces between the actuator and the brake disk is made possible by virtue of the elastic element, in particular by means of a soft spring. It is advantageous if the elastic element is designed in such a way that transmission of a movement and/or force, in particular an axial movement and/or force, from the parking brake to the brake disk is made possible, and transmission of a movement and/or force, in particular an axial movement and/or force, from the brake disk to the parking brake is prevented. It is thereby possible to avoid negative influencing—e.g. mechanical loading of the parking brake or even driver discomfort due to transmitted braking runout or noise. At the same time, however, preparation of a braking process, in the sense of a "brake prefill" is made possible and hence a safety-relevant function is provided.

This should be taken to mean that a force transmitted between the parking brake and the brake piston by means of the elastic element is sufficient to transmit a movement and/or a force of the parking brake to the brake piston and/or the brake pad, in particular in order to place the brake pad against the brake disk by means of brake piston and/or in order to allow pre-filling of a hydraulic chamber in the brake cylinder housing. Moreover, the transmitted force is small enough to avoid transmission of a movement and/or a force of the brake pad and/or of the brake piston to the parking brake, in particular in order to avoid transmission of braking runout of a brake disk to the parking brake by means of the brake pad and of the brake piston.

A method for controlling a braking device for a motor vehicle is furthermore provided, which device contains at least one brake actuator, wherein the braking device has at least one brake pad and a brake disk, and wherein the brake pad is placed against the brake disk in such a way that no braking force or only a small braking force acting on the motor vehicle is built up. According to the disclosure, this is characterized in that the brake pad is placed against the brake disk by means of an elastic element.

"Placing against" should be taken to mean that a release clearance between the brake pad or brake pads and the brake disk is substantially overcome. In particular, it is envisaged that the release clearance is completely overcome and the brake pad or brake pads actually rest against the brake disk. Here, both brake pads, for example, are centered and placed against the brake disk. According to the disclosure, a brake of the vehicle—to be more precise a brake actuator of a brake of the vehicle—can place the brake pad against the brake disk by means of an elastic element situated between the brake actuator and the brake disk without, however, building up a braking force or leading to any other effect, in particular force-related effect, between the brake disk and the brake actuator.

Here, it is advantageous if the method includes a method for controlling a parking brake and a method for controlling a service brake. Here, it is advantageous if the control of the braking device applies both to the control of the actuator and also, for example, to the control of valves in a hydraulic system. It is advantageous if the placing of the brake pads is accomplished by control of a parking brake.

It is advantageous if the method is started when a defined operating state of the motor vehicle is present. Such an operating state can be determined on the basis of data detected by means of sensors, for example. Such data relates, for example, to environmental data (e.g. detected pedestrians) and/or vehicle data (e.g. presence of acceleration/deceleration) and/or data on the driver (e.g. distraction). A potential emergency braking situation can represent one such operating situation, for example. Equally, however, the method can also advantageously be used continuously when rapid reactions are required, e.g. during an autonomous driving maneuver.

It is advantageous if, in the context of the method, the parking brake is controlled by means of path control. Path control is used to define a path which the actuator travels as it applies the parking brake. During the path control of the parking brake, at least one total release path and a force release path are taken into account, wherein the force release path takes account of a caliper stiffness and a clamping force, wherein, in particular, the caliper stiffness is determined in the context of the last parking brake operation performed, and wherein, in particular, the clamping force corresponds to the last clamping force set.

Caliper stiffness can also advantageously be measured during several locking operations and averaged in a suitable way. Force buildup between a first force (e.g. 0 kN on a fully released brake) and a defined second force (e.g. 12 kN) is described as delta F. This gives delta F=caliper stiffness*force release path. With a caliper stiffness of, for example, 30 kN/mm, a force release path of 0.4 mm is obtained. The total release path is always set to the same value, for example. Assuming a total release path s2 of, for example, 1.4 mm, an idle path of mm is obtained, wherein the difference between the total release path and the force release path defines the idle path (idle path=total release path−force release path).

Owing to possible disturbance variables, e.g. thermal relaxation, further tightening, locking under pressure or tolerances in the measurement system, there may be different effects: a path which is too short may be set by means of the path control system, for example. In this case, too short means that the brake piston is pushed at least partially out of the housing, wherein actual contact between the brake pads and the brake disk is not assured. By virtue of the path control and the defined path length traveled, however, it is nevertheless possible to assume that the release clearance has been substantially overcome. As an alternative, force estimation can be employed to detect actual contact. Moreover, a path which is too long can possibly be set during path control. Since the spring comes into action in this case, such an effect is relatively uncritical. However, provision is advantageously made to keep a sufficient spring operating path in reserve for such a case.

A service braking operation has at least two phases, wherein, in a first phase of the service braking operation, no force is transmitted from the service brake to the brake disk and, in a second phase of the service braking operation, a force is transmitted from the actuator of the service brake to the brake disk. A force is transmitted hydraulically, for example. In particular, the transmitted force produces a frictional force and/or a clamping force between the brake pad and the brake disk, which leads in turn to a braking force and/or a holding force acting on the motor vehicle. Here, the first and second phases describe a time sequence of a braking operation. It is advantageous if the first phase of the service braking operation is shortened, in particular eliminated, by means of the control of the parking brake.

A parking brake operation can furthermore have at least three phases, wherein, in a first phase of the parking brake operation, no force is transmitted from the parking brake to the brake disk and, in a second phase of the parking brake operation, a force is transmitted from the parking brake to the brake disk by means of the elastic element, and, in a third phase of the parking brake operation, a force is transmitted from the parking brake to the brake disk by means of a geometric link. A geometric link is taken to mean a rigid, i.e. non-elastic, link between at least two components. It is advantageous if the parking brake is operated in the first and second phases of the parking brake operation in order to shorten, in particular to eliminate, the first phase of the service brake operation. A force can be transmitted by virtue of the displacement of a component for example, e.g. the spindle nut, and can arise by virtue of a deformation of a component, e.g. the elastic element.

It is advantageous if the method for controlling the braking device has at least 4 steps, wherein, in a first step, the parking brake is activated, and, in a second step, the elastic element is placed against the brake piston by virtue of a change in the parking brake brought about by the activation, in particular a movement of an electromechanical device, and, in a third step, the elastic element is put under stress in such a way, by virtue of a further change in the parking brake brought about by the activation, in particular a further movement of an electromechanical device, that the force which arises moves the brake piston, and, in a fourth step, a further change in the parking brake, in particular a further movement of an electromechanical device, is prevented. It is advantageous if the prevention of the further movement in the fourth step takes place as soon as the brake pad moved by the brake piston has been placed or is deemed to have been placed against the brake disk. Path control can be used for this purpose. The described steps of the method also describe a time sequence.

It is advantageous if the method for controlling the braking device has a further, fifth step, in which the elastic element no longer has any elastic properties by virtue of a further change in the parking brake brought about by the activation, in particular a further movement of an electromechanical device. For this purpose, the elastic system is bridged. For example, a spring is moved so as to form a block or some other geometric, in particular positive, link between further components, e.g. the spindle nut and the brake piston, is achieved by means of the movement.

The method for controlling the braking device is advantageously distinguished by the fact that activation of control of the parking brake is based on a request by a specific driving function, and/or activation of control of the parking brake takes place automatically in a specific driving situation, and/or deactivation of the first operating mode of the parking brake takes place automatically when a specific driving function ceases, and/or deactivation of the first operating mode of the parking brake takes place automatically when a specific driving situation ceases. Activation and/or deactivation controlled by the driver can furthermore advantageously be implemented.

A control unit is furthermore provided, which is designed, i.e. set up, and has means to carry out the method described.

Is furthermore advantageously envisaged that the parking brake is a "motor on caliper" brake system.

BRIEF DESCRIPTION OF THE DRAWINGS

Further features and the advantageousness of the disclosure will become apparent from the description of illustrative embodiments with reference to the attached figures.

Of the figures.

DETAILED DESCRIPTION

Figure 1:
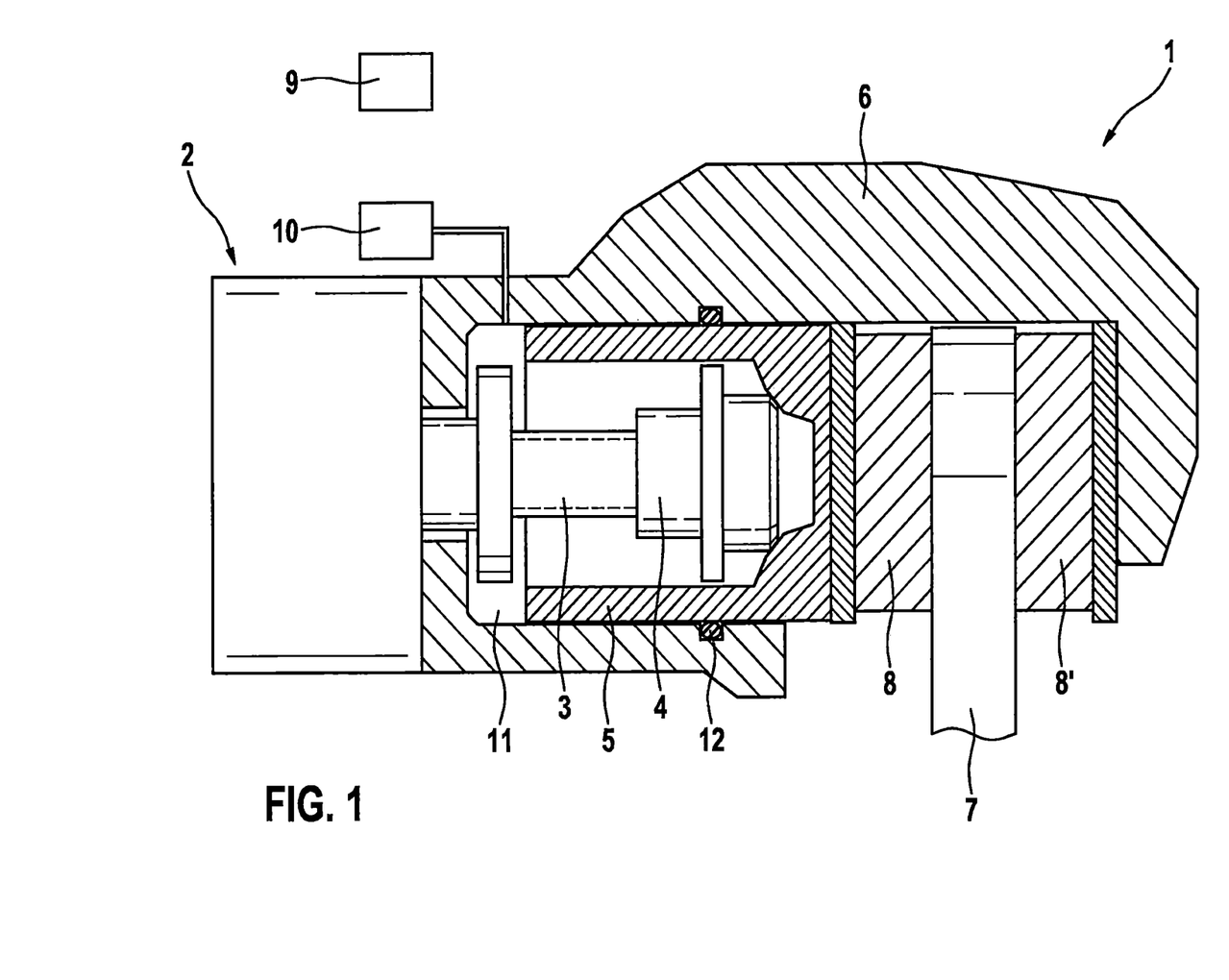
FIG. 1 as the prior art, shows a schematic section through a braking device having an automatic parking brake of "motor on caliper" construction.

FIG. 1 shows a schematic section through a braking device 1 for a vehicle as per the prior art. Here, the braking device 1 has an automated (automatic) parking brake (immobilizing brake), which can exert a clamping force to immobilize the vehicle by means of an actuator 2 (brake motor), which in the present case is designed as a DC motor. For this purpose, the actuator 2 of the parking brake drives a spindle 3, in particular a threaded spindle 3, supported in an axial direction. At its end remote from the actuator 2, the spindle 3 is provided with a spindle nut 4, which rests against the brake piston 5 in the applied state of the automated parking brake. In this way, the parking brake transmits a force to the brake pads (8, 8') or the brake disk (7) electromechanically.

Here, the spindle nut rests on an inner end face of the brake piston 5 (also referred to as the rear side of the brake piston head or inner piston head). FIG. 1 shows contact with an inner end face of the brake piston 5, said face being designed as a toroidal connecting surface and connecting an inner head surface and inner lateral surfaces of the brake piston 5. As an alternative, contact with the inner head surface or some other formation on the brake piston 5 is also conceivable. During a rotary motion of the actuator 2 and a resulting rotary motion of the spindle 3, the spindle nut 4 is moved in the axial direction. The spindle nut 4 and the brake piston 5 are supported in a brake caliper 6, which fits over a brake disk 7 in the manner of pincers.

Respective brake pads 8, 8' are arranged on each side of the brake disk 7. In the case of an application process of the braking device 1 by means of the automated parking brake, the electric motor (actuator 2) turns, whereupon the spindle nut 4 and the brake piston 5 are moved toward the brake disk 7 in the axial direction in order in this way to produce a predetermined clamping force between the brake pads 8, 8' and the brake disk 7.

As depicted, the automated parking brake is designed as a "motor on caliper" system and combined with the service brake, for example. This could also be regarded as integrated into the system of the service brake. Both the automated parking brake and the service brake act on the same brake piston 5 and the same brake caliper 6 in order to build up a braking force on the brake disk 7. However, the service brake has a separate actuator 10. In FIG. 1, the service brake is configured as a hydraulic system, wherein the actuator 10 is formed by the ESP pump. In the case of a service braking operation, a predetermined clamping force is built up hydraulically between the brake pads 8, 8' and the brake disk 7. To build up a braking force by means of the hydraulic service brake, a medium 11, in particular a substantially incompressible brake fluid 11, is forced into a fluid chamber delimited by the brake piston 5 and the brake caliper 6. For this purpose, the brake piston 5 is sealed off from the environment by means of a piston sealing ring 12.

The brake actuators 2 and 10 are controlled by means of an output stage, i.e. by means of a control unit 9, which can, for example, be a control unit of an electronic stability system, such as ESP (electronic stability program) or some other control unit.

In controlling the automated parking brake, it is first of all necessary to overcome the idle path or release clearance before a braking force can be built up. This applies analogously also to the service brake. The term "idle path" is used, for example, to denote the distance which the spindle nut 4 has to traverse through rotation of the spindle 3 in order to come into contact with the brake piston 5. The term "release clearance" is used to denote the distance between the brake pads 8, 8' and the brake disk 7 in disk brake systems of motor vehicles. In terms of the overall control process, in particular in the case of the automated parking brake, this operation generally takes a relatively long time. At the end of such a preparation phase, the brake pads 8, 8' have been placed against the brake disk 7 and the force buildup begins during a further control process. As the brake pads 8, 8' are placed in contact, it is therefore important according to this disclosure that no braking force is imposed or that the braking force imposed as they are placed in contact is as small as possible so as to avoid producing any unwanted premature braking effect. FIG. 1 shows the state of the idle path and release clearance that has already been overcome. Here, the brake pads 8, 8' have been placed against the brake disk 7 and all the brakes, i.e. both the parking brake and the service brake, can immediately build up a braking force at the corresponding wheel during a subsequent control process.

Figure 2:
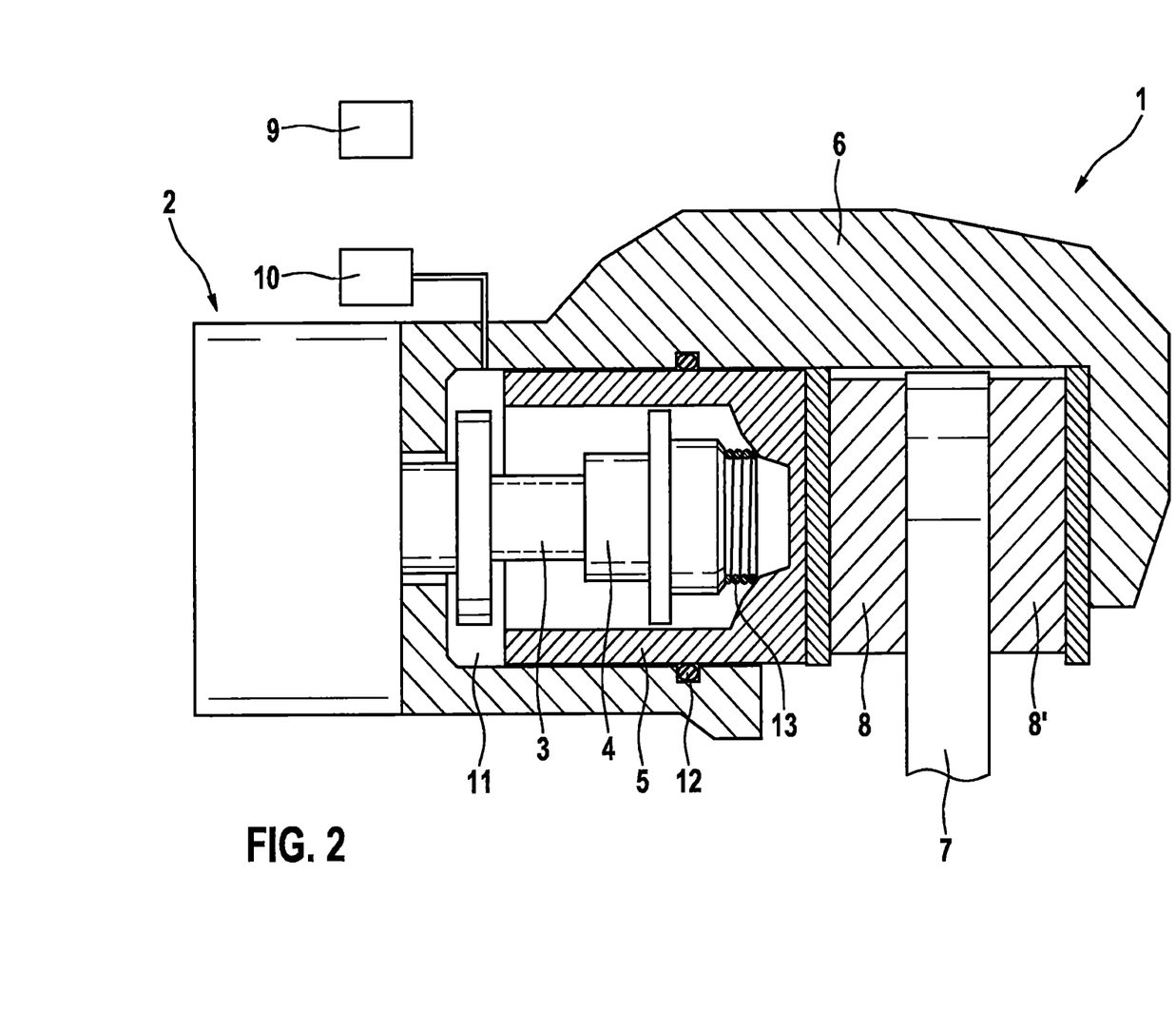
FIG. 2 shows a braking device having a spring system between the spindle nut and the brake piston in one possible arrangement of the spring system.

FIG. 2 shows an embodiment according to the disclosure of a braking device 1 having an elastic element 13 in one possible first arrangement of the elastic element 13. In other respects, the braking device is of very similar configuration to the braking device described in FIG. 1. In FIG. 2, the elastic element 13 is configured as a spring system 13, wherein a spiral spring is shown. The spring system 13 is arranged between the spindle nut 4 and the brake piston 5. The spring system 13 can be received by and/or guided on the spindle nut 4 and/or the brake piston 5 or some other component. These components can have an appropriate configuration, e.g. a contact surface for the spring system 13. It is also possible to provide a permanent or detachable connection between the spring system 13 and one or more of these components. However, such embodiments are not shown in FIG. 2.

To overcome the release clearance between the brake disk 7 and the brake pads 8, 8' by means of the parking brake, the actuator 2 and the spindle nut 4 are used. In this case, the spindle 3, for example, is turned, and the spindle nut 4 is therefore moved axially in the direction of the brake disk 7. During this process, the spindle nut produces a force on the spring system 13, which is positioned between the spindle nut 4 and the brake piston 5. The spring constant of the spring system 13 is chosen in such a way that the spring system 13 can push the brake piston 5 in the direction of the brake disk 7 during application. The brake piston 5 is thereby moved axially in the direction of the brake disk 7.

In general, however, the spring system 13 is designed or chosen in such a way that it has a low spring constant. This makes it possible for only a small force to be transmitted to the brake piston 5 by means of the spring system 13.

To apply an actual braking force and/or holding force by means of the parking brake, the actuator 2 of the parking brake and the spindle nut 4 are likewise used. For this purpose, it is envisaged that the spring travel of the spring system 13 is limited.

The embodiment in FIG. 2 shows the spring system 13 as switched so as to be inoperative. This is accomplished by compressing the spring system 13 into a block. This should be taken to mean that the spring turns rest directly one upon the other and that there are no longer any elastic properties in the spring system 13. This gives rise to a direct link between the spindle nut 4 and the brake piston 5. The spring system 13 therefore becomes inoperative during corresponding deflection of the spindle nut or while a force is correspondingly acting.

Figure 5:
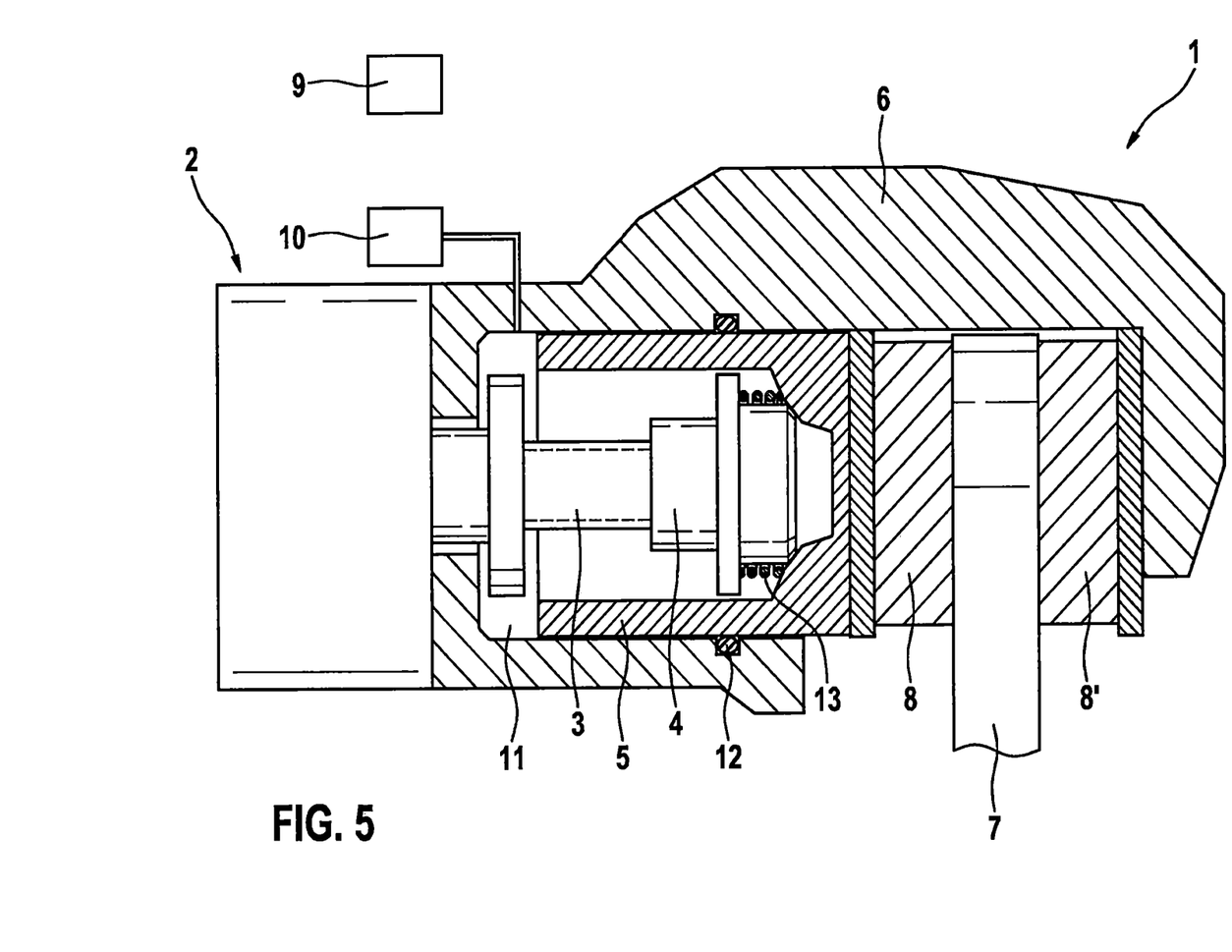
FIG. 5 shows a braking device having a spring system, which is switched so as to be inoperative.
Figure 6:
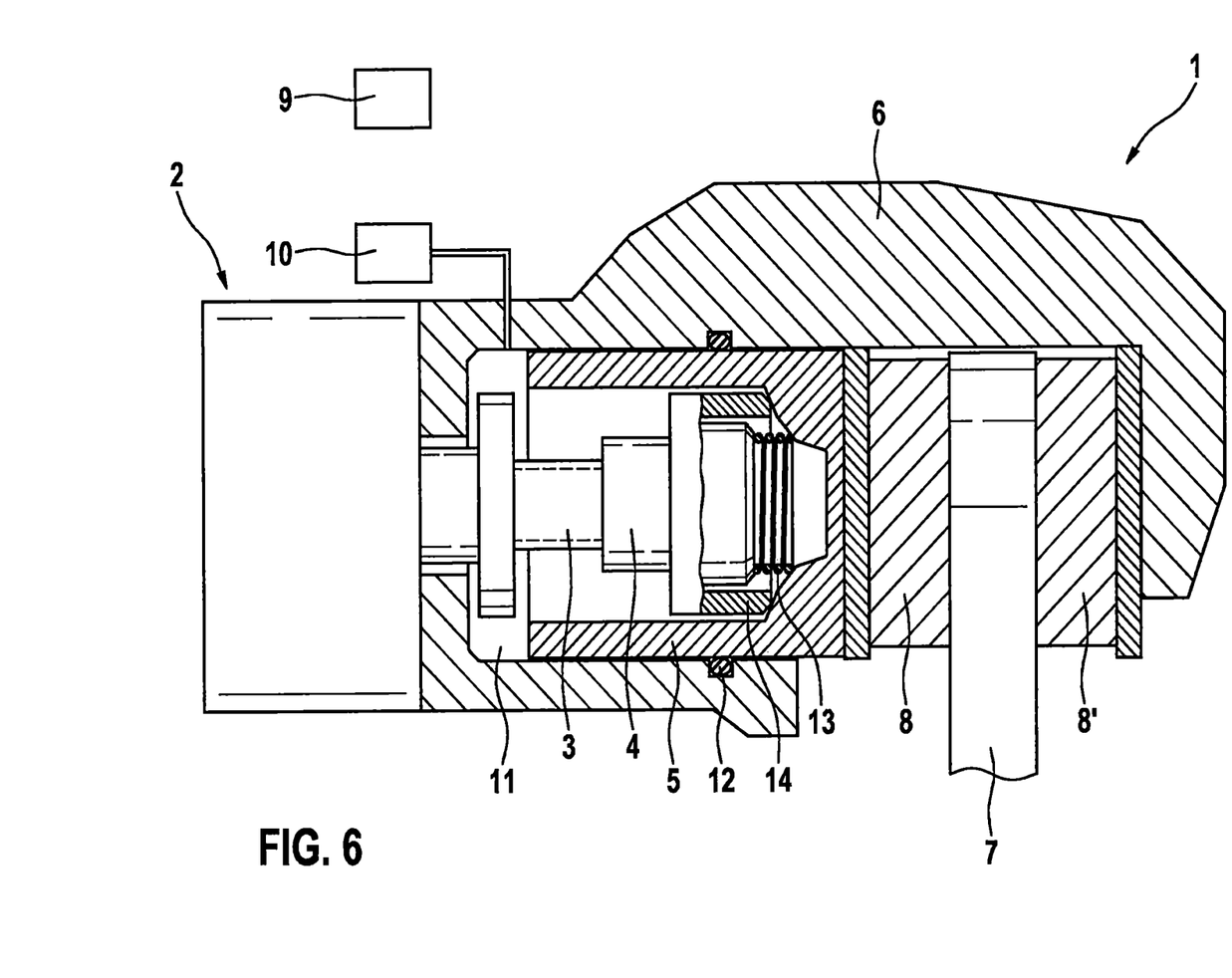
FIG. 6 shows a braking device having a spring system which is switched so as to be inoperative in an alternative embodiment.

In alternative embodiments, further compression of the spring or direct force transmission between the spindle nut 4 and the brake piston 5 can also be avoided by appropriate dimensioning and arrangement of the spring system 13 (as shown in FIG. 5). A non-elastic link by means of a geometric configuration (e.g. a support 14) of the spindle nut 4 and/or of the inner head of the brake piston 5 can also be enabled (as shown in FIG. 6).

FIGS. 3a to 3d show a control sequence for the parking brake and the resulting movements of the components of the braking device 1 according to the disclosure.

Figure 3A:
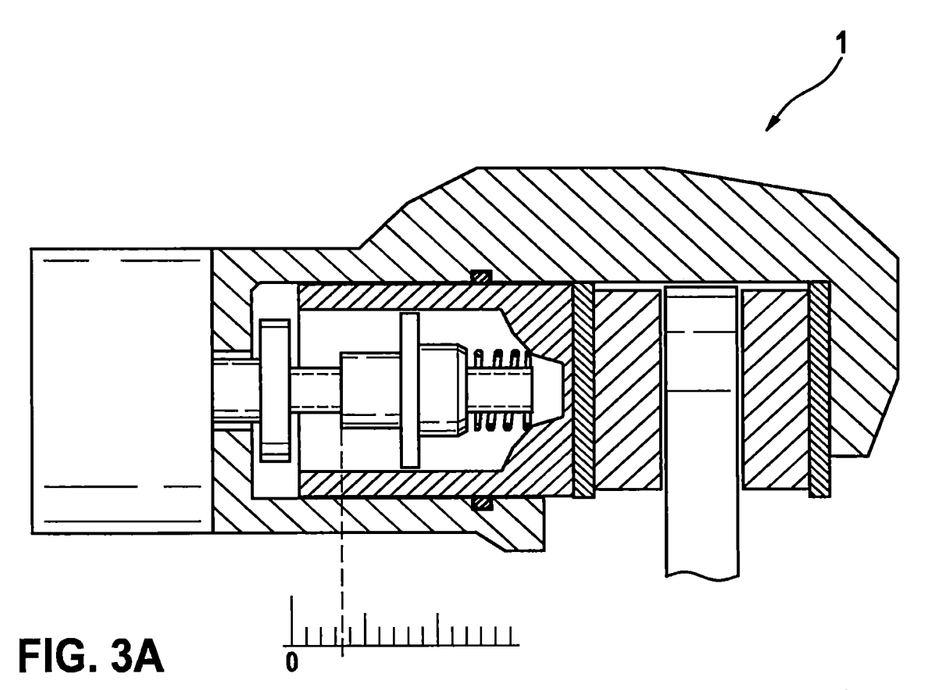
FIGS. 3a-3d show a control sequence for the parking brake and the effects thereof.

FIG. 3a shows a braking device 1 having an automated parking brake in a normal operating state, wherein the parking brake is "open", i.e. is not prepared for braking. This means that the spring system 13 is not preloaded and the brake piston 5 can operate and move independently of the parking brake. Here, the parking brake is not activated and is shown in a rest position. The location of an illustrative rest position of the spindle nut 4 is indicated by means of an axial length scale. In the embodiment shown, the spring system 13 is connected to the piston head of the brake piston 5 or is at least resting against the latter. There is no further fixed link between the spring system 13 and the spindle nut 4. No spring force is therefore exerted between the components, namely the spindle nut 4 and the brake piston 5, by means of the spring system 13. An air gap is established between the brake disk 7 and the brake pads 8, 8'. The air gap is established essentially by the piston sealing ring 12 between the brake piston 5 and the housing of the brake caliper 6. When the service brake is hydraulically relieved, as shown in FIG. 3a, the piston sealing ring 12 pulls the brake piston 5 back into the housing of the brake caliper 6 and, in the process, reduces internal forces.

Figure 3B:
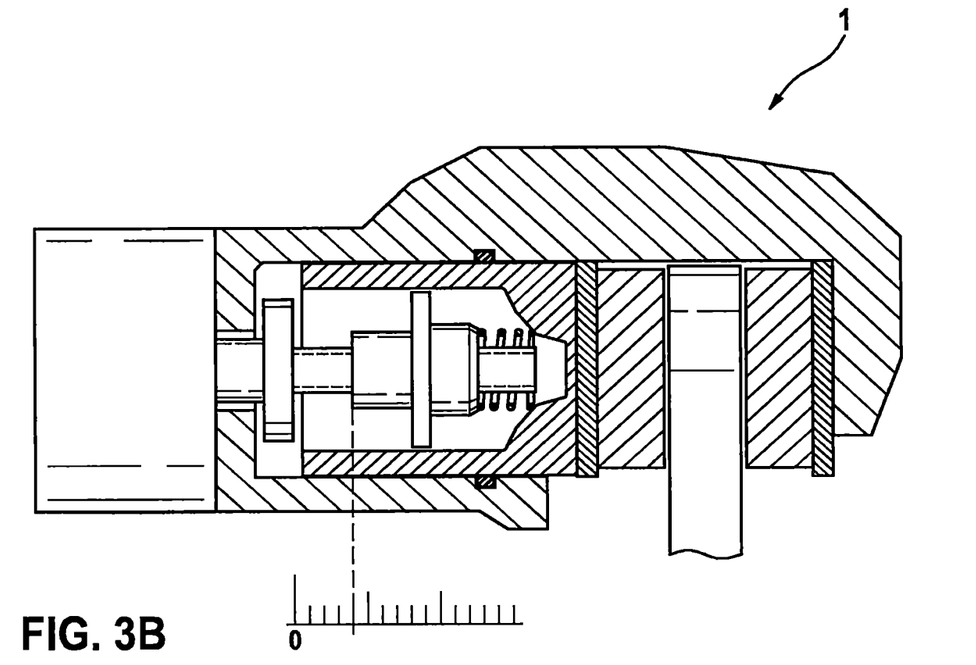

FIG. 3b shows a braking device 1 having an automated parking brake in an activated state. Activation is started when, for example, a situation in which it could be useful to improve the buildup dynamics of braking is detected. During this activation, the actuator 2 of the parking brake is actuated in the "closing" direction. The spindle nut 4 is thereby moved out of its rest position, as illustrated by means of the axial length scale. During this process, the spring system 13 ultimately comes into contact at both ends with the piston head of the brake piston 5 and the spindle nut 4 of the piston-spindle unit of the parking brake. At this time, however, there is still an air gap between the brake disk 7 and the brake pads 8, 8'.

Figure 3C:
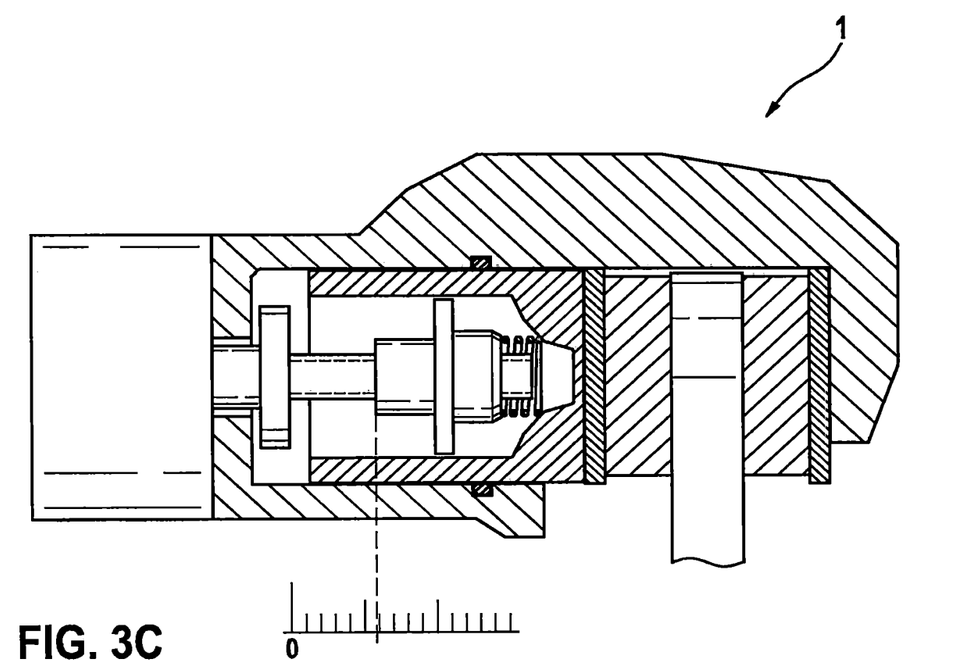

FIG. 3c shows a braking device having an automated parking brake in an activated state, in which the air gap between the brake disk 7 and the brake pads 8, 8' has already been closed. An actuation of the parking brake actuator 2 in the closing direction which is further or longer than that in FIG. 3b correspondingly leads to the spindle nut 4 being moved further out of its rest position, as illustrated by means of the axial length scale. This further displacement of the spindle nut 4 in the direction of the brake disk 7 leads to increasing compression of the spring system 13. As a result, a spring force comes into effect between the brake piston 5 and the spindle nut 4. Since the spindle nut 4 is supported on the housing of the brake caliper 6 via the spindle 3 (not shown in FIGS. 3a-3d), the brake piston 5 moves in the direction of the brake disk 7 as soon as the spring force is greater than the opposing force provided by the sealing ring 12 of the brake piston 5. A typical force for moving the brake piston is at a pressure equivalent of about 3 bar. The actuation of the parking brake actuator 2 is ended when, for example, the release clearance between the brake disk 7 and the brake pads 8, 8' has be minimized or eliminated, i.e. the brake pads have been placed or are deemed to have been placed against the brake disk. Such actuation and switching off of the parking brake actuator 2 can take place in a path-dependent manner, for example.

Owing to the movement of the brake piston 5, the hydraulic chamber resulting between the brake caliper 6 and the brake piston 5 is initially enlarged somewhat. A slight vacuum furthermore results from this. Owing to the vacuum, additional brake fluid 11 is drawn automatically from a reservoir via the brake lines until the vacuum is no longer present. The reservoir can be formed in a housing having the hydraulic actuator 10 (ESP pump) of the hydraulic service brake, for example. Suitable control of the valves (not shown in the figures) of the hydraulic system of the service brake is likewise performed, in particular to allow additional brake fluid 11 to be drawn from the reservoir.

If a further pressure is demanded in this state, in which a release clearance has been minimized and the hydraulic system has also already been prepared for braking, the movement of the liquid column by means of the hydraulic actuator 10 of the service brake, e.g. the ESP pump, means that significantly less or no additional brake fluid 11 is required to bring the brake piston 5 into contact with the brake pads 8, 8' or to place the brake pads 8, 8' against the brake disk 7 and to build up a braking force. Movement of the liquid column thus leads almost immediately to a pressure buildup via the brake caliper 6 and hence to rapid provision of a braking torque. The stopping distance of the vehicle can thereby be reduced.

Moreover, in the state shown in FIG. 3b and FIG. 3c, i.e. as long as the vehicle is still in an unbraked state, a movement of the brake piston 5, e.g. in response to the presence of brake disk runout, is made possible by the spring system. An unwanted braking torque, in particular an unnecessarily high braking torque, is thereby avoided. The spring system 13 thus makes possible, in particular, decoupling of the actuator 2 of the parking brake from the brake disk 7.

Figure 3D:
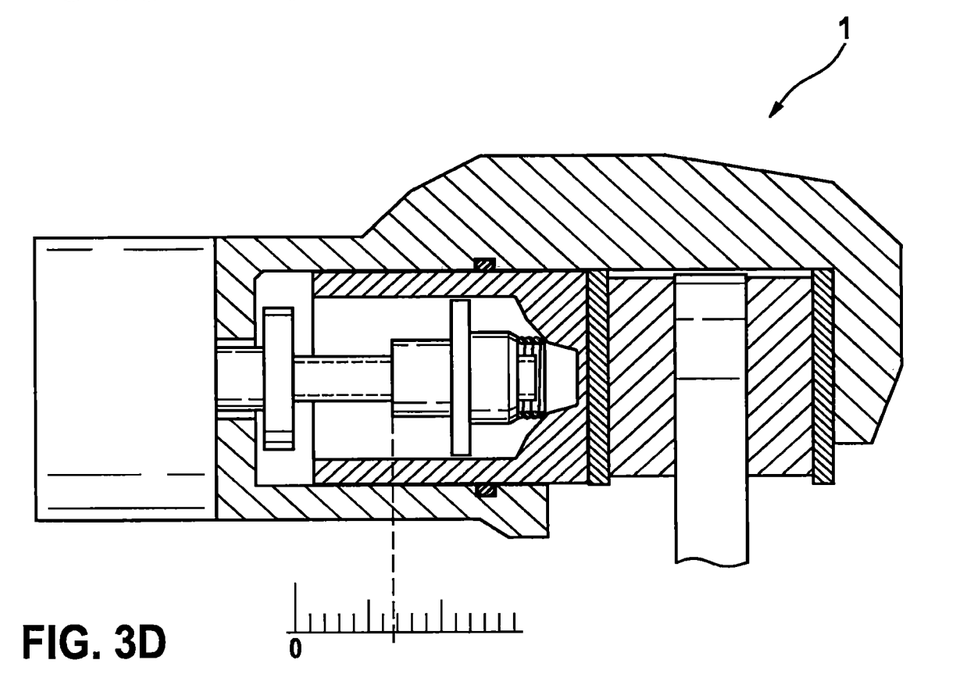

FIG. 3d shows a braking device having an automated parking brake in a state in which direct force transmission from the spindle nut 4 to the brake piston 5 is made possible. If the parking brake is to be closed, the actuator 2 of the parking brake is actuated further in a known manner, and the spindle nut 4 is moved further out of its rest position, as illustrated by means of the axial length scale. The spring system 13 is compressed further until the elements of the spring system 13 form a block and hence are no longer operative. Direct force transmission from the spindle nut 4 to the brake piston 5 is thereby made possible. By virtue of the fact that the spring system 13 forms a block, there is an indirect link between the spindle nut 4 and the brake piston 5 via the spring system 13 forming a block.

Figure 4:
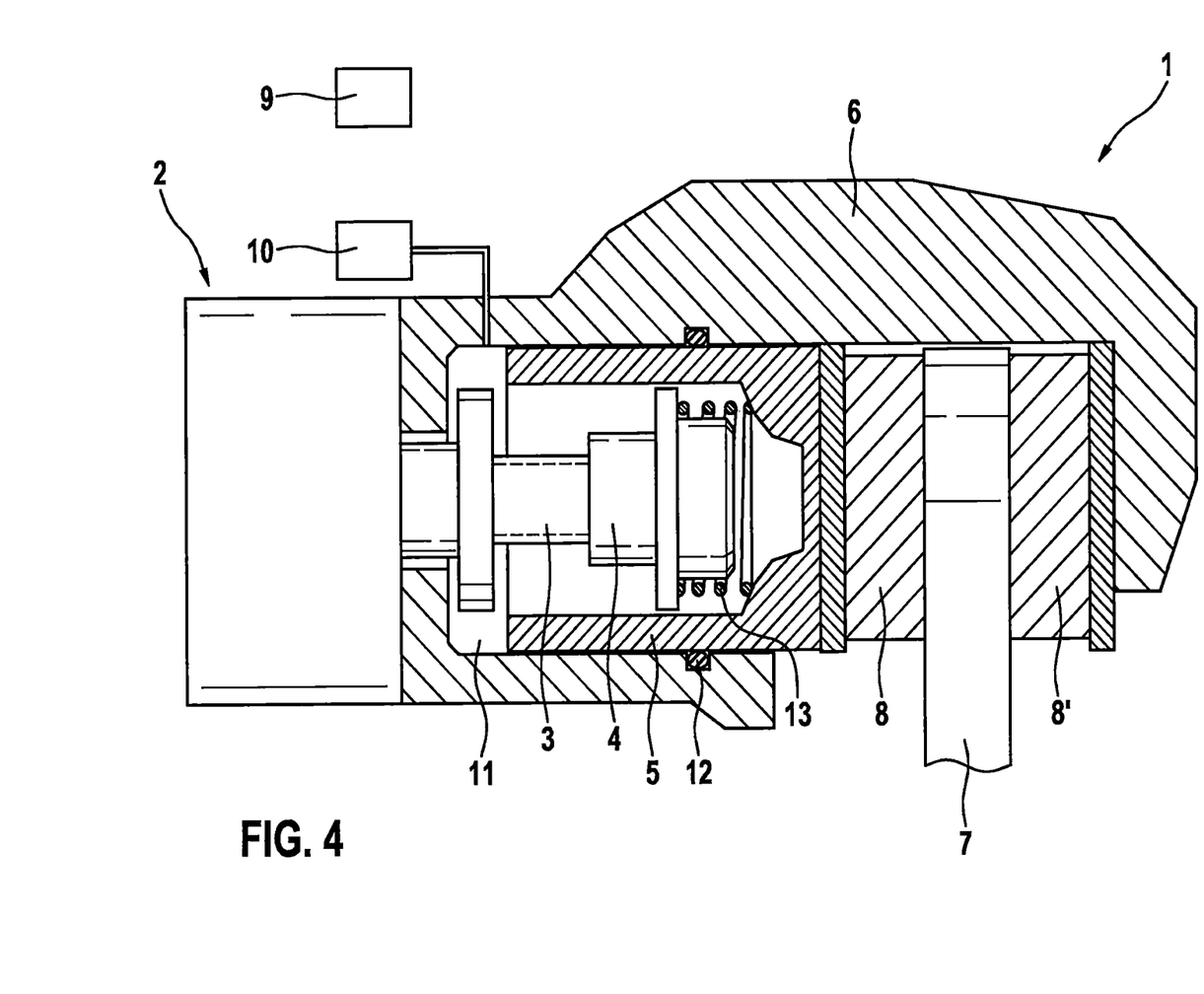
FIG. 4 shows a braking device having an alternative arrangement of the spring system.

FIG. 4 shows a braking device having an alternative arrangement of the spring system 13 between the spindle nut 4 and the brake piston 5. The spring system 13 is likewise configured as a spiral spring. Here, appropriate dimensioning and arrangement of the spring system 13 and geometric configuration of the spindle nut 4 and of the inner end face of the brake piston 5 were performed in such a way that, after a certain displacement of the spindle nut out of the rest position, further compression of the spring is avoided and direct force transmission between the spindle nut 4 and the brake piston 5 is made possible. In contrast to FIG. 3d, the spring system 13 is not moved into a block in this process in order to allow direct force transmission. In this context, FIG. 5 shows a configuration in which a direct connection is formed between the spindle nut 4 and the brake piston 5 without moving the spring into a block. Moreover, other alternatives for the arrangement of the spring system are possible in order to achieve the same effect, e.g. a direct arrangement of the spring system between the inner head surface of the brake piston 5 and the end face of the spindle nut 4 facing the inner head surface of the brake piston 5.

FIG. 6 shows a braking device having a similar arrangement of the spring system between the spindle nut and the brake piston 5 to that in FIG. 2. However, the difference in FIG. 6 is that the spindle nut 4 has a support 14. By virtue of the geometric configuration of the spindle nut 4—or of the support 14—and of the inner end face of the brake piston 5, further compression of the spring is avoided and direct force transmission between the spindle nut 4 and the brake piston 5 is made possible after a certain displacement of the spindle nut out of the rest position. In the language of the present document, a geometric link comes into being during this process between the two components, namely the spindle nut 4 and the brake piston 5, due to direct contact between the two components. Owing to the two substantially non-elastic components, the spindle nut 4 and the brake piston 5, this geometric link can be regarded as non-elastic. In this displacement, as in the displacement shown in FIG. 5, the spring system 13 is no longer operative or only to a subordinate and auxiliary extent.

The invention claimed is:

1. A braking device for a motor vehicle, comprising:
    at least one brake, including:
        at least one brake pad; and
        a brake disk; and
    an elastic element selectively operable to move the at least one brake pad relative to the brake disk;
    wherein the braking device, in a first non-braking operating state, is configured to operate the elastic element to move the at least one brake pad into contact with the brake disk such that the at least one brake pad and the brake disk generate either no braking force or a relatively small braking force acting on the motor vehicle.

2. The braking device according to claim 1, wherein the at least one brake includes a service brake and an automated parking brake.

3. The braking device according to claim 2, wherein the parking brake is configured to place the at least one brake pad against the brake disk with the elastic element.

4. The braking device according to claim 2, further comprising a brake piston, wherein:
the parking brake includes a spindle nut;
the elastic element is a spring system; and
the spring system is positioned between the spindle nut of the parking brake and the brake piston.

5. The braking device according to claim 2, wherein:
the elastic element is configured to enable transmission of at least one of (i) movement and (ii) force from the parking brake to the brake disk; and
the elastic element is further configured to inhibit transmission of at least one of (i) movement and (ii) force from the brake disk to the parking brake.

6. The braking device according to claim 2, wherein the service brake is a hydraulic brake.

7. The braking device according to claim 1, wherein the braking device is adjustable between at least (i) the first non-braking operating state, (ii) a second non-braking operating state, and (iii) a third braking operating state, whereat:
in the second non-braking operating state of the brake device, the at least one brake pad is spaced apart from the brake disk by a release clearance distance and transmits no force to the brake disk; and
in the third braking operating state of the brake device, the at least one brake pad transmits a force to the brake disk via a geometric link between a spindle nut and the brake piston.

8. A braking device for a motor vehicle, comprising:
a brake piston;
at least one brake, including:
a spindle nut;
at least one brake pad; and
a brake disk; and
an elastic element positioned between the spindle nut and the brake piston, and selectively operable to move the at least one brake pad relative to the brake disk;
wherein the braking device, in a first non-braking operating state, is configured to operate the elastic element to move the at least one brake pad into contact with the brake disk such that the at least one brake pad and the brake disk generate either no braking force or a relatively small braking force acting on the motor vehicle; and
wherein the braking device is adjustable between at least (i) the first non-braking operating state, (ii) a second non-braking operating state, and (iii) a third braking operating state, whereat:
in the second non-braking operating state of the brake device, the at least one brake pad is spaced apart from the brake disk by a release clearance distance and transmits no force to the brake disk, and the elastic element is in an uncompressed state; and
in the third braking operating state of the brake device, the at least one brake pad transmits a force to the brake disk via a geometric link between the spindle nut and the brake piston.

9. The braking device according to claim 2, further comprising a brake piston, wherein:
the parking brake includes a spindle nut;
the elastic element includes a spring; and
the spring is positioned between the spindle nut of the parking brake and the brake piston.

10. A method for controlling a braking device for a motor vehicle, the braking device having at least one brake actuator, comprising:
operating an elastic element in a first non-braking configuration to move at least one brake pad into contact with a brake disk, such that either no braking force or a relatively small braking force acting on the motor vehicle is generated.

11. The method for controlling a braking device according to claim 10, further comprising using a parking brake to control the placement of the at least one brake pad against the brake disk.

12. The method for controlling a braking device according to claim 11, further comprising using a path control process to control the parking brake.

13. The method for controlling a braking device according to claim 11, further comprising operating a service brake in a braking configuration of the braking device, the operating of the service brake in the braking configuration including:
in a first phase, transmitting no force from the service brake to the brake disk; and
in a second phase, transmitting a force from the service brake to the brake disk;
wherein the using of the parking brake to control the placement of the at least one brake pad in contact with the brake disk is performed prior to the first phase, and causes shortening or elimination of time needed to complete the first phase of operating the service brake.

14. The braking device according to claim 13, wherein:
the service brake is a hydraulic brake;
completing the first phase of operating the service brake includes filling a hydraulic chamber of the hydraulic brake; and
using the parking brake to control the placement of the at least one brake pad against the brake disk causes the hydraulic chamber of the hydraulic brake to at least partially fill.

15. The method for controlling a braking device according to claim 10, further comprising, in a second non-braking configuration:
activating a parking brake;
placing the elastic element against a brake piston in response to a change in the parking brake caused by movement of an electromechanical device;
putting the elastic element under stress in response to a further change in the parking brake caused by further movement of the electromechanical device, the further change in the parking brake producing a force that moves the brake piston, so as to transition the braking device to the first non-braking configuration; and
preventing a further change in the parking brake and further movement of the electromechanical device.

16. The method for controlling a braking device according to claim 10, wherein the method is executed by a control unit of the brake disk.

* * * * *

UNITED STATES PATENT AND TRADEMARK OFFICE
CERTIFICATE OF CORRECTION

PATENT NO. : 10,697,510 B2
APPLICATION NO. : 15/317075
DATED : June 30, 2020
INVENTOR(S) : Baehrle-Miller et al.

Page 1 of 1

It is certified that error appears in the above-identified patent and that said Letters Patent is hereby corrected as shown below:

At Column 13, Lines 29-57, Claim 8 should be deleted and replaced with the following claim:
--8. The braking device according to claim 7, wherein in the second non-braking operating state, the elastic element is in an uncompressed state.--

Signed and Sealed this
Sixth Day of October, 2020

Andrei Iancu
*Director of the United States Patent and Trademark Office*